June 19, 1956  F. M. BOWERS  2,750,593
WELDING HELMET FACE SHIELD
Filed March 10, 1954
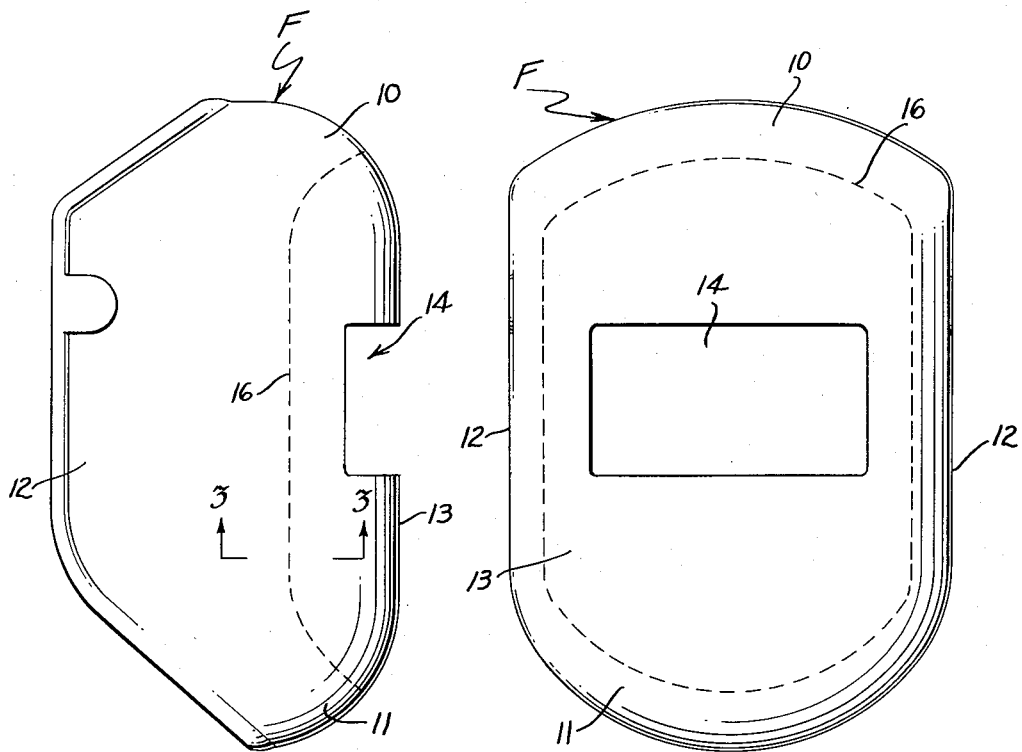
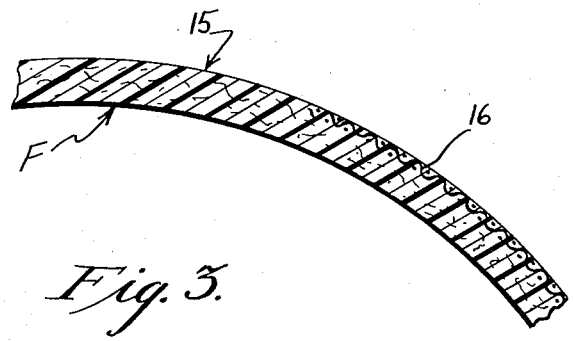
INVENTOR.
FREDERICK M. BOWERS
BY
Joshua A. H. Potts
HIS ATTORNEY.

United States Patent Office 2,750,593
Patented June 19, 1956

2,750,593
WELDING HELMET FACE SHIELD

Frederick M. Bowers, Nether Providence Township, Delaware County, Pa., assignor to The Fibre Metal Products Company, Chester, Pa., a corporation of Pennsylvania Application March 10, 1954, Serial No. 415,399

2 Claims. (Cl. 2—9)

This invention relates to a welding helmet face shield and particularly to a welding helmet face shield of high strength, and resistant to damage from sparks and particles of molten metal.

Until recently, arc welding helmets and helmets for protection against sparks, molten metal, and other industrial hazards, which helmets included face shields, were made from a vulcanized fibre. Although this material was quite satisfactory for this purpose, it possessed the inherent disadvantage of having an affinity for the moisture content in the surrounding air. Absorbtion of this moisture by the vulcanized fibre caused the said fibre to lose its shape, resulting in a considerable warpage thereof.

In an effort to overcome this problem, manufacturers of welding equipment have been making welding helmets and face shields from Fiberglas, which utilizes even threads of glass cut into proper length, preformed into a given shape, and bonded together with a polyester resin under heat and pressure. This material does not absorb moisture from the air and therefore welding helmets and face shields made therefrom are not subject to warpage. In addition, the resultant product is very strong. However, even this improved material possesses an inherent weakness for use in arc welding and the like, in that when hot sparks or globules of molten metal fall against or on the Fiberglas item, such as while doing overhead welding, the polyester binder tends to burn, while the glass remains intact. But should hot sparks or globules of molten metal continue to strike the item in the same place, the polyester having already been damaged, the glass fibers will then deteriorate to a point where holes of various sizes will appear, rendering the item substantially useless, from a safety point of view.

It is an object of this invention, therefore, to provide an improved welding helmet face shield.

It is another object of this invention to provide an improved welding helmet face shield which is resistant to damage by sparks or globules of molten metal.

It is a further object of this invention to provide an improved welding helmet face shield of such a construction as to rapidly dissipate any heat resulting from the contact of falling sparks or globules of molten metal therewith.

It is still another object of this invention to provide a welding helmet face shield of combined high strength and fire resistant characteristics.

These objectives together with other objectives and advantages to be derived from the present invention will readily become apparent by reference to the following disclosures and the accompanying drawings wherein similar numerals refer to similar parts throughout the several views.

Figure 1 is a side elevational view of the welding helmet face shield of the present invention.

Figure 2 is a front elevational view of the welding helmet face shield of Fig. 1.

Figure 3 is a sectional view with parts broken away of the welding helmet face shield of this invention, taken along the line 3—3 of Fig. 1.

Referring to the drawings, there is shown in Figs. 1 and 2 a welding helmet face shield referred to in its entirety by the letter F. This face shield, which is preferably made from Fiberglas bonded with a polyester resin under heat and pressure, is provided with a top frontal portion 10, a chin portion 11, side portions 12 and a front face 13. The said front face 13 is provided with a rectangular opening 14 for purposes of vision. This opening may be provided with a suitable protective closure such as glass or a suitable fire resistant transparent plastic.

Closely adjacent to the external surface 15 of the face shield F, as shown in Fig. 3, is embedded a fine wire, closely woven metal screen 16, which screen is embedded therein during the molding process. It is preferred that this screen be made from a metal which is a good conductor of heat. Aluminum screening composed of .013" wire x 30 mesh has been found to be satisfactory for this purpose, although copper screening or steel screening may also be used.

Referring to Figs. 1 and 2, it will be seen that this screening is provided only in the frontal area of the face shield, extending from the top frontal portion 10 to the chin portion 11 and substantially covering the front face 13 thereof.

With a metal screen thus embedded near the surface of the face shield, as above described, the said face shield is rendered resistant to structural failure from burning and charring from falling sparks and globules of molten metal; since as a spark or molten metal comes into contact with the said metal screen, the damaging heat will be quickly dissipated throughout the screen, without serious damage to the face shield, inasmuch as the said screen is a good conductor of heat. Only the front portion of the helmet is provided with such a screen since the face is considered to be the most vulnerable part of the head and is the area of the head most commonly subjected to injury from sparks or molten metal.

It is thus seen that the overall characteristics of a Fiberglas welding helmet face shield are greatly improved with little penalty in the increase of weight of the item. It is also obvious that a welding helmet face shield made in accordance with the precepts of the present invention will have a much longer life than current Fiberglas face shields of this type which, as pointed out above, are subject to deterioration through burning or charring.

Although the present discussion has been limited to the above-described preferred embodiment, variations thereof are possible without departing from the spirit of the invention. It is therefore not intended that the invention be limited to the particular embodiment disclosed, but only to the inventive concept as defined by the appended claims.

What is claimed is:

1. In a welding helmet made of Fiberglas bonded in polyester resin, a face portion formed with a window opening and having inner and outer surfaces, the outer surface being exposed to the welding operation being performed by the wearer of the helmet, and a fine wire metal screen embedded in said face portion substantially throughout the extent thereof at said outer surface, with portions of said wire screen being exposed whereby said screen portions are adapted to be engaged by sparks from the welding operation and dissipate the heat from said sparks throughout the screen.

2. In a welding helmet including a U-shaped mask made of Fiberglas bonded in polyester resin, said mask comprising side portions, a top portion, and a chin portion, together with a face portion bounded by said side, top, and chin portions, said face portion being formed with a window opening and having inner and outer surfaces, the said outer surface being exposed to any welding operation being performed by the wearer of the helmet, and a fine wire metal screen embedded in said face portion substantially throughout the extent thereof and at said outer surface, portions of said screen being exposed whereby they are adapted to be engaged by sparks from the welding operation to dissipate the heat of said sparks throughout the entire screen.

References Cited in the file of this patent

UNITED STATES PATENTS

| | | |
|---|---|---|
| 1,835,883 | Lewis | Dec. 8, 1931 |
| 1,910,127 | Schmidt | May 23, 1933 |
| 2,312,227 | Yant | Feb. 23, 1943 |
| 2,362,610 | Bowers | Nov. 14, 1944 |
| 2,631,287 | Malcom | Mar. 17, 1953 |
| 2,655,656 | Moeller | Oct. 20, 1953 |